United States Patent [19]

Miller

[11] 4,155,645

[45] May 22, 1979

[54] MICROFICHE STORAGE DEVICE

[76] Inventor: Norman K. Miller, Concord Industrial Park, Concordville, Pa. 19331

[21] Appl. No.: 888,474

[22] Filed: Mar. 20, 1978

[51] Int. Cl.² ................................................ G03B 27/52

[52] U.S. Cl. ......................................... 355/75; 211/55; 211/128; 354/292

[58] Field of Search ....................... 355/75, 64; 211/55, 211/128; 354/292; 40/10 D

[56] References Cited

U.S. PATENT DOCUMENTS

| | | | |
|---|---|---|---|
| 4,055,381 | 10/1977 | Lauer et al. | 355/75 |
| 4,118,120 | 10/1978 | Ruffner et al. | 355/75 |

FOREIGN PATENT DOCUMENTS

| | | | |
|---|---|---|---|
| 1084264 | 7/1954 | France | 355/75 |
| 1287675 | 9/1972 | United Kingdom | 355/75 |
| 1409248 | 10/1975 | United Kingdom | 355/75 |
| 1427027 | 3/1976 | United Kingdom | 355/75 |

*Primary Examiner*—Richard A. Wintercorn

*Attorney, Agent, or Firm*—Robert K. Youtie

[57] ABSTRACT

A storage device for microfiche cards and the like wherein a pair of sheets are secured in facing relation, one of which is provided with a plurality of parallel slots for receiving microfiche, and the other is cut to define a plurality of inverted generally U-shaped sheet formations having their upper bight regions or apices secured to the slotted sheet between respective slots. This permits of microfiche insertion through each slot between respectively adjacent inverted U-shaped formations to a limiting position of the microfiche with its edge engaging the junctures of the depending legs with the associated sheet.

11 Claims, 7 Drawing Figures

FIG. 5
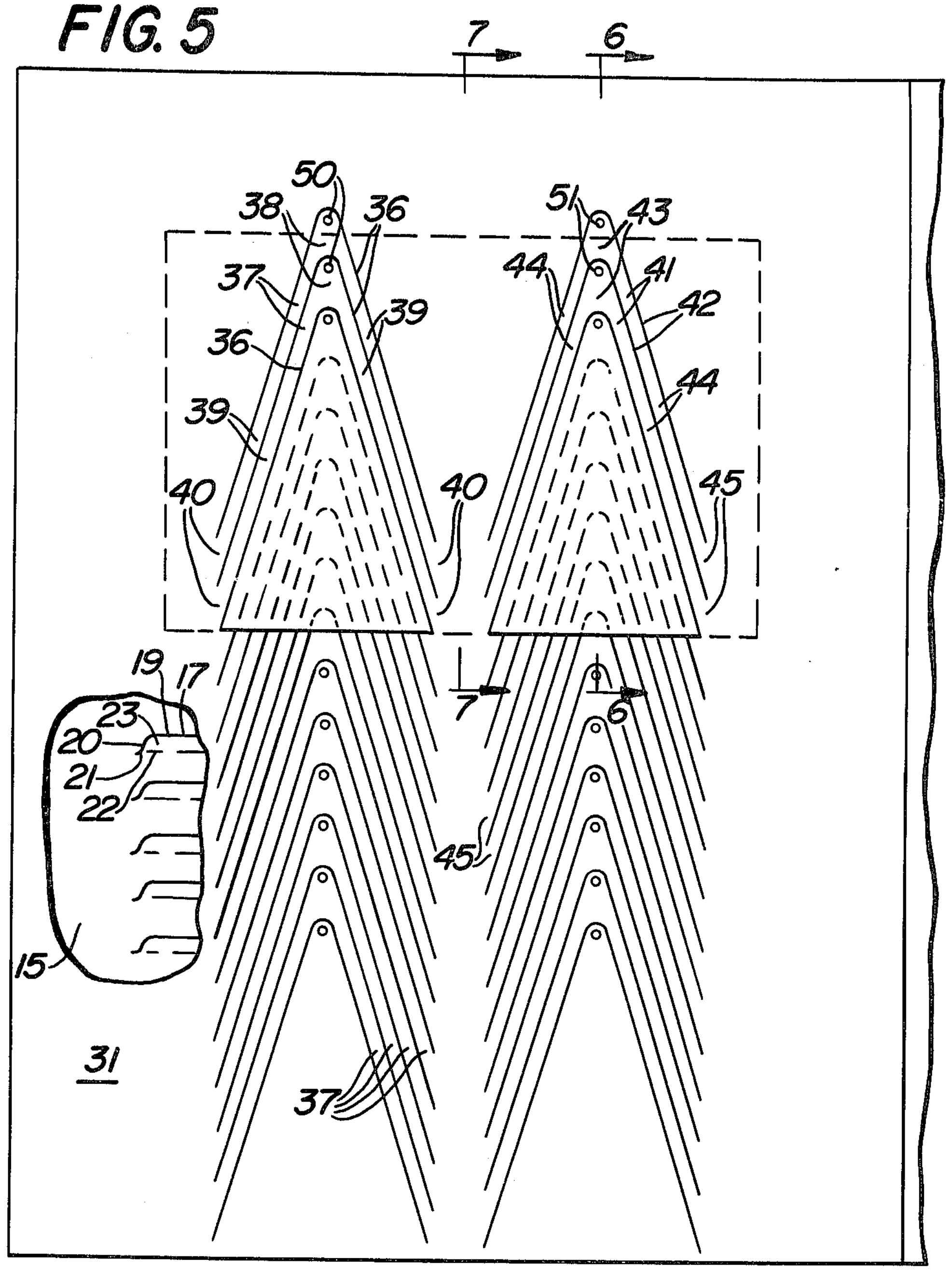
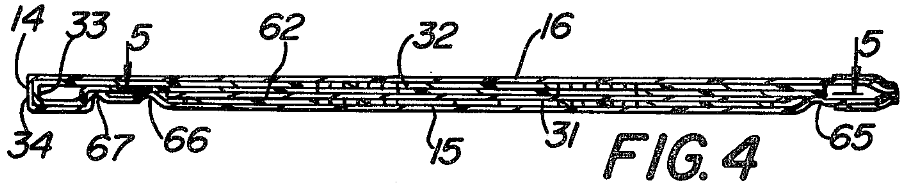
FIG. 4

MICROFICHE STORAGE DEVICE

BACKGROUND OF THE INVENTION

While there have, in the past, been provided a variety of storage devices for microfiche cards, and the like, such storage devices have not been entirely satisfactory, often obscuring the microfiche identifying indicia, insufficiently protecting the film of the microfiche, being unduly expensive even in large quantities, lacking versatility in mounting and usage, and otherwise not entirely satisfactorily achieving the desired ends.

SUMMARY OF THE INVENTION

It is, therefore, an important object of the present invention to provide a storage device for microfiche and the like, which overcomes the above-mentioned difficulties, being extremely simple to use both in removal and replacement of microfiche, highly protective thereof, well adapted for economic mass production to achieve substantial economies in costs, permitting of wide versatility in mounting including that of loose leaf mounting, cabinet filing, carousel hanging and combinations thereof, and greatly enhance useful life to further reduce replacement costs.

It is another object of the present invention to provide a microfiche storage device having uniquely advantageous features including slot formations of enhanced resistance to tearing, which slot formations may be of reduced dimensions to increase the storage capacity or number of pockets per panel.

It is still another object of the present invention to provide a uniquely advantageous structure for storing microfiche, wherein microfiche of different thicknesses may be accommodated with desired tightness or holding in the retaining pockets.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

BRIEF DESCRIPTION OF THE DRAWINGS

FIG. 4 is a horizontal sectional view taken generally along the line 4—4 of FIG. 1.

FIG. 5 is a vertical sectional view taken generally along the line 5—5 of FIG. 4.

DESCRIPTION OF THE PREFERRED EMBODIMENT

Figure 1:
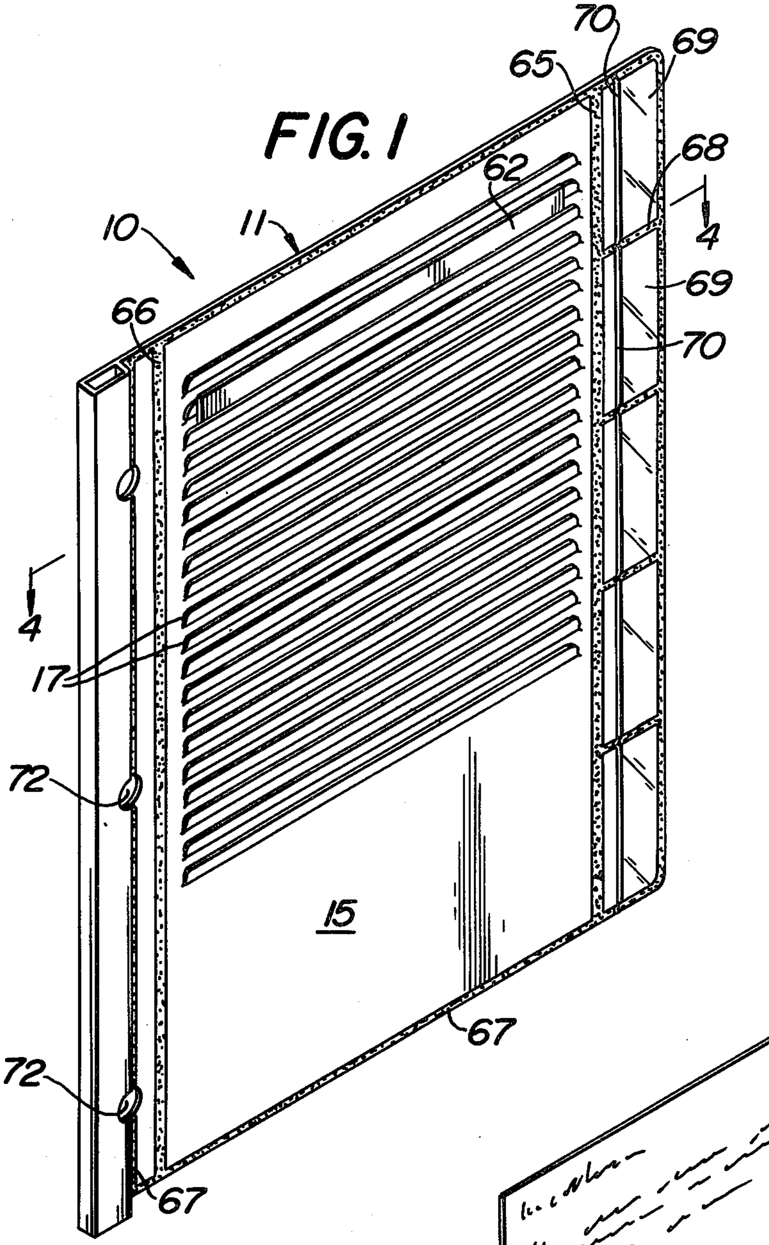
FIG. 1 is a perspective view showing a microfiche storage panel constructed in accordance with the teachings of the present invention.
Figure 3:
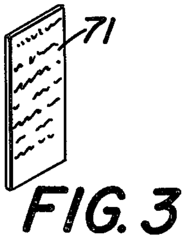
FIG. 3 is a perspective view showing a label for use in conjunction with the storage panel of FIG. 1.
Figure 2:
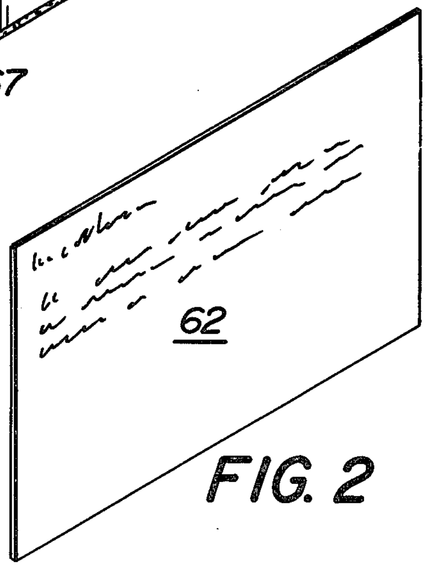
FIG. 2 is a perspective view showing a microfiche card, or the like to be stored.

Referring now more particularly to the drawings, and specifically to FIG. 1., a microfiche storage device is there generally designated 10, and includes a generally rectangular panel 11, which may advantageously be essentially identical on both faces, so that only a single face or side need be shown.

The panel 11 includes a pair of relatively stiff outer sheets 15 and 16, of generally congruent rectangular formation in facing relation with each other. The outer sheets 15 and 16 may be integral and connected together along one edge region, as by a tubular formation or tunnel 24. Each of the generally rectangular outer sheets 15 and 16 are formed with a plurality of generally parallel, horizontally extending slots, as at 17 on outer sheet 15, and as at 18 on outer sheet 16. The slots 17 are all identical, being formed in a row extending downwardly from the upper region of the outer sheet 15 to a location spaced above the lower edge of the latter outer sheet. Specifically, each slot 17 may be defined by a generally straight slit 19 which extends laterally across the major portion of the sheet 15 and terminates at both its opposite ends in reversely curved or generally S-shaped end portions. More specifically, as best seen in FIG. 5, each slit end portion curves smoothly arcuately downwardly, as at 20, and thence continues smoothly arcuately and laterally outwardly, as at 21. Thus, each slit end portion 20, 21 extends generally downwardly from its respective slit 19 and terminates in a laterally outwardly extending portion 21. Further, the outer sheet 15 is further formed with a plurality of laterally extending, generally parallel folds or creases, as at 22, each extending between and terminating at opposite end portions 21 of a respective slit 19. Thus, the creases 22 extend generally parallel to the slits 19, each slit 19 and its associated crease 22 combining to define of the sheet region bounded there within an upwardly and outwardly extending sheet portion or flap 23.

Similarly, the slots 18 of the other outer sheet 16 are formed of generally horizontally extending slits or cuts 24 terminating in S-shaped end portions, and there are provided similar creases or folds 25 which combine with respective slits 24 to define of the material bounded there within obliquely upwardly and outwardly extending sheet portions or flaps 26.

It will be appreciate that upon outward force or pull on the flaps 23 and 26, the S-shaped slit end portions resist and deter tearing, as extending away from the direction of tearing force.

On the inner side of and in facing relation with each of the outer sheets 15 and 16 is a respective inner sheet 31 and 32. The inner sheets 31 and 32 are generally congruent to each other and the outer sheets, and are advantageously fabricated of material having more flexibility than that of the outer sheets. It has been found, in practice, advantageous to fabricate both the outer and inner sheets 15, 16, 31 and 32 of thermoplastic or thermoplastic coated sheeting, for purposes appearing presently.

The relatively flexible inner sheets 31 and 32 are sandwiched in facing engagement with each other between respectively adjacent outer sheets 15 and 16, and may be substantially identical to each other. In addition, the inner sheets may be integral with each other, say having one adjacent pair of side edges integrally connected, as by a tubular, specifically configured, reversely bent connecting portion 33. Also, the outer sheets 15 and 16 may be integral, having one pair of adjacent side edges integrally connected by a reversely bent connecting portion 34, which conformably engages about the inner sheet connecting portion 33, see FIG. 4.

One of the inner sheets 31 is best seen in FIG. 5, as being formed with a plurality of generally inverted U-shaped cuts 36 disposed in conformably nesting relation one within the other. Thus, the several nesting inverted U-shaped cuts 36 are arranged in a vertical row of cuts, and each adjacent pair of cuts combines to define of the material of inner sheet 31 between the adjacent pair of cuts and inverted generally U-shaped sheet formation 37. Each U-shaped sheet formation includes a medial or intermediate bight region 38, from which extend a pair of laterally spaced, depending legs 39. As defined by the several cuts 36, the formations 37 have their medial or bight regions 38 free of the sheet 31, and the legs 39 depend from the upper free portion 38 to respective junctures 40 with the remaining portion of sheet 31.

Adjacent to and spaced laterally from the generally vertical row of nesting inverted U-shaped sheet formations 37 are a similar plurality of nested inverted U-shaped sheet formations 41 disposed in a vertical row adjacent to and spaced laterally from the vertical row of formations 37. The formations 41 may be defined by a plurality of generally inverted U-shaped cuts 42 formed in the inner sheet 31 in nesting relation one within the other, the thus define U-shaped formations 41 each including a free upper or intermediate portion 43 and a pair of laterally spaced depending legs 44. The legs have their lower ends terminating at junctions 45 with the remainder of sheet 31. While a pair of vertical rows of nesting U-shaped formations 37 and 41 are shown and described, it will be appreciated that a single such vertical row of formations may be employed, if desired.

The sheet 32 may be similarly cut to define one or more vertical rows of inverted generally U-shaped formations, which may be identical to that illustrated and described hereinbefore with respect to inner sheet 31.

In the assembled relation of inner sheet 31 in facing relation with the inner face or side of outer sheet 15, the free intermediate or upper portions 38 and 43 of the several inverted U-shaped formations 37 and 41 may each be respectively secured to the outer sheet 15, as at the locations 50 and 51 between respective slots 17. Specifically, the securement of upper free portions is advantageously by thermoplastic welding, or the like. The other inner sheet 32 similarly has its nesting inverted generally U-shaped formations, which are designated 60 and seen in FIG. 6, secured at their upper portions by welds or other securement means 61 to the adjacent outer sheet 16 between the slots 18.

Figure 7:
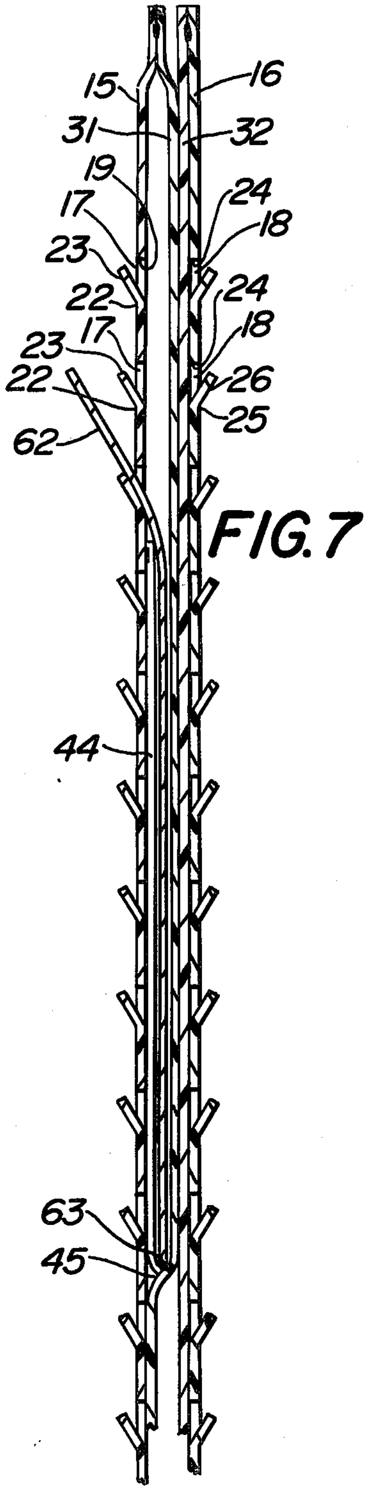
FIG. 7 is a sectional elevational view taken generally along the line 7—7 of FIG. 5.
Figure 6:
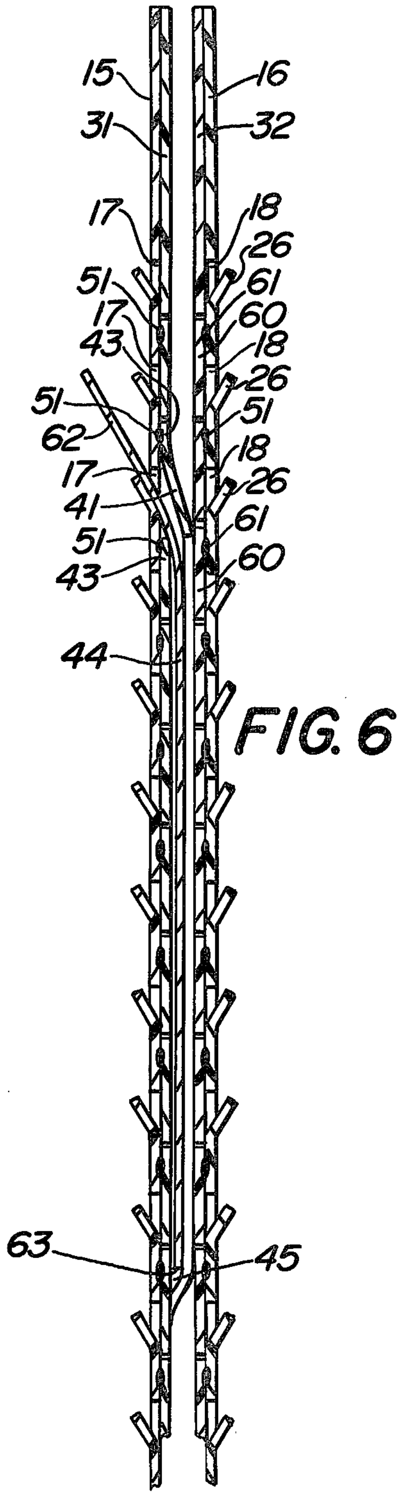
FIG. 6 is a sectional elevational view taken generally along the line 6—6 of FIG. 5.

Thus, the slots 17 and 18 each combine with the adjacent pair of inverted U-shaped formations having their free upper portions secured above and below the respective slot to define a pocket for receiving a microfiche or card 62. As best seen in FIGS. 6 and 7, the microfiche or card 62 enters a pocket or slot 17 extending downwardly between the next adjacent upper and lower formations 41. Specifically, the microfiche or card 62 extends inwardly beneath the upper portion 43 of the next adjacent upper formation 41 and over the upper portion 43 of the next adjacent lower formation, depending on the outer side of the legs 44 of the next adjacent upper formation and on the inner side of the legs 44 of the next adjacent lower formation. In this condition, the microfiche or card 62 depends to its lower edge 63 in limiting engagement with the junctures 45 of the receiving formations 41.

Of course, this condition may be repeated for a microfiche card in each slot 17 and 18.

In addition to the foregoing assembly, there are provided generally vertically extending lines of securement 65 and 66 securing together vertically extending zones of the sheets 15, 31, 32 and 16, which zones extend generally normal to the slots 17 and 18, being located spaced beyond the slot ends. Also, an additional securement zone 67 may extend generally parallel to and laterally outward of the securement zone 66, to secure the overlying portions of outer and inner sheets together, just inward of the tunnel or tube 24. Also, a peripheral or marginal securement zone 64 may extend about the marginal edge of the overlying sheets 15, 31, 32 and 16, except along the edge tube or tunnel 24, so that the several sheets define a unitary assembly. In addition, a plurality of generally vertically spaced, horizontally extending securement zones 68 may extend between vertical securement zone 65 and the outer vertical marginal securement zone, serving to secure in place a plurality of clear sheets 69, having one edge unsecured, as at 70, to define pockets for removably retaining indicia slips 71.

In the method of manufacture, it is only necessary to provide the integral die cut inner sheets 31, 33 and 32, folded within the folded integral die cut outer sheets 16, 34 and 15. By the single impression of a sealing die all of the hereinbefore described securement zones may be simultaneously formed, while a suitable rod or bar may temporarily engage in the tunnel 24 to maintain the desired configuration thereof. Hence, extremely simple, quick and economical mass production manufacture may be achieved. In use, the tunnel 24 may serve for mounting, as by carousel stand, filing cabinet, or the like; and suitable apertures may be provided, as at 72, for loose leaf mounting, if desired.

In order to satisfactorily accommodate microfiche of any required thickness with satisfactory frictional retention in the receiving pockets, the spacing of securement zones 65 and 66 closer to or further away from the slots 17 may serve to vary the snug retaining effect of the pockets. Hence, if it is desired to handle the storage panels 11, say even to invert the same without removal of microfiche, the spacing of securement zones 65 and 66 from the slot 17 may be suitably selected for this purpose.

Also, it is appreciated that the die cut inner sheet formations 37 and 41 may be of other specific configuration, if desired, say with legs diverging more or less and of greater or less lengths, it only being essential that the free upper portions of the formations be adhered to the adjacent outer sheets between the slots thereof, after which several sheets may be secured together by the securement means 65–68 as described hereinbefore.

From the foregoing, it is seen that the present invention provides a storage device for microfiche cards and the like, which is extremely simple in construction and manufacture, capable of great versatility in use, durable and reliable throughout a long useful like, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. A storage device for microfiche cards or the like, said device comprising an outer sheet having front and back faces, a plurality of generally parallel slots formed in said outer sheet for removably receiving microfiche, an inner sheet in facing relation with the back face of said outer sheet, said inner sheet having a plurality of generally inverted U-shape cuts in nesting relation with each other, said cuts defining of the inner sheet material between adjacent pairs of cuts a plurality of generally inverted U-shaped sheet formations in nesting relation with each other, said sheet formations each including an upper portion free of said inner sheet and a pair of legs depending from said upper portion to junctions with said inner sheet, and formation securing means securing said upper formation portions to said outer sheet at locations between said slots, whereby microfiche cards are insertable into said slots for entry between an adjacent pair of said sheet formations into edge engagement with said leg junctions.

2. A storage device according to claim 1, said slots each being defined by a slit through said outer sheet having a generally straight medial portion and smoothly continuous end portions each extending arcuately downwardly and thence arcuately outwardly generally longitudinally of the medial portion.

3. A storage device according to claim 2, said outer sheet having a crease extending between the end portions of each slit, to define a guide flap of the outer sheet material between each slit and crease.

4. A storage device according to claim 1, in combination with sheet securing means securing said outer and inner sheets together adjacent to and outwardly beyond the ends of said slots.

5. A storage device according to claim 4, said sheet securing means comprising generally parallel zones of securement extending generally normal to said slots.

6. A storage device according to claim 1, in combination with an additional outer sheet in facing relation with said inner sheet on the side thereof opposite to said first-mentioned outer sheet, and sheet securing means securing together said inner sheet and said first mentioned and additional outer sheets along generally parallel zones adjacent to and outwardly beyond the ends of said slots.

7. A storage device according to claim 6, said additional outer sheet having an additional plurality of generally parallel slots for removably receiving microfiche, and an additional inner sheet between said first-mentioned inner and said additional outer sheets, said additional inner sheet having an additional plurality of generally inverted U-shaped cuts in nesting relation with each other, said additional cuts defining of the additional sheet material between adjacent pairs of additional cuts a plurality of additional generally U-shaped sheet formations in nesting relation with each other, said additional sheet formations each including an additional upper portion free of said additional inner sheet and an additional pair of legs depending from said additional upper portion to junctions with said additional inner sheet, and additional securing means securing said additional upper formation portions to said additional outer sheet at locations between said additional slots, whereby microfiche cards are insertable into said additional slots for entry between an adjacent pair of said additional sheet formations into edge engagement with associated leg junctions.

8. A storage device according to claim 7, said additional slots each being defined by an additional slit through said additional outer sheet having a generally straight medial portion and smoothly continuous end portion each extending arcuately downwardly and thence arcuately outwardly.

9. A storage device according to claim 7, said additional inner sheet being secured to said first-mentioned inner and outer sheets by said sheet securing means.

10. A storage device according to claim 9, said first inner and additional inner sheets being integrally connected together outwardly beyond one of said sheet securement zones to define a mounting tunnel.

11. A storage device according to claim 9, said first-mentioned and additional outer sheets being integrally connected together outwardly beyond one of said sheet securement zones to define a mounting tunnel.

* * * * *